May 28, 1957
C. LORENZEN
2,793,734
FRUIT ORIENTING MECHANISM
Filed Sept. 28, 1955
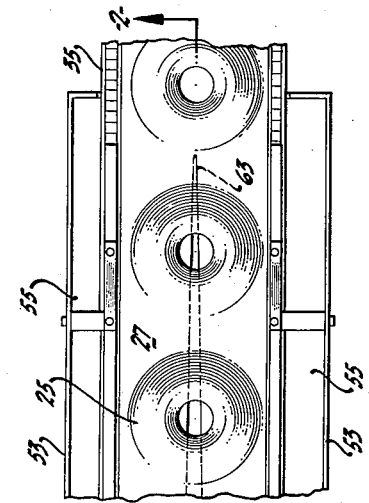
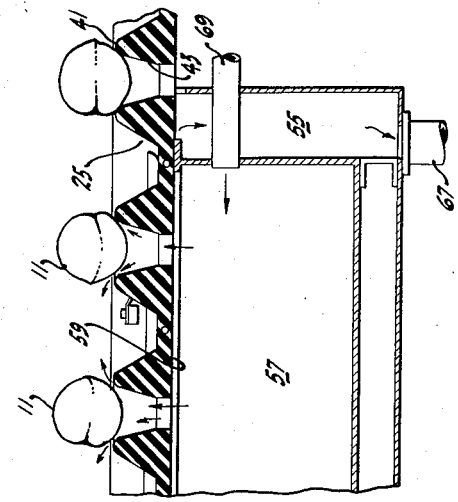
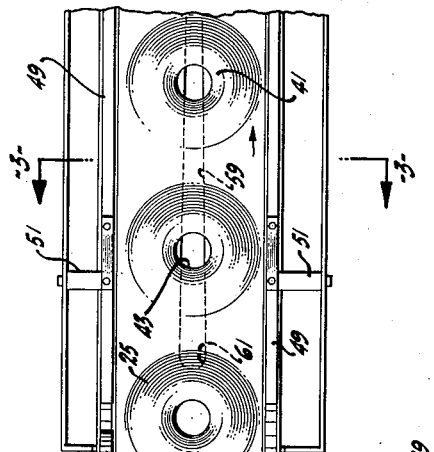
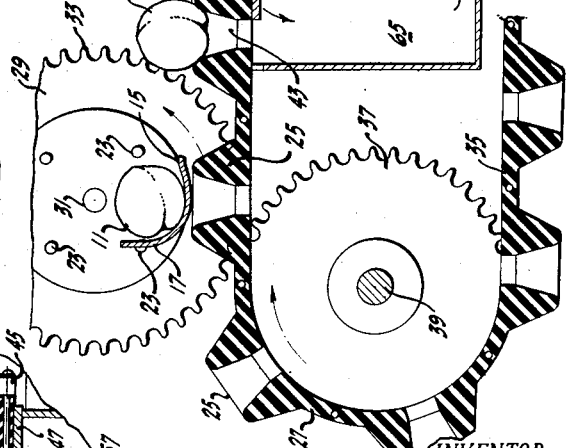
INVENTOR.
COBY LORENZEN
BY
ATTORNEYS United States Patent Office 2,793,734
Patented May 28, 1957

2,793,734

FRUIT ORIENTING MECHANISM

Coby Lorenzen, Davis, Calif., assignor to The Regents of the University of California, Berkeley, Calif., a corporation of California Application September 28, 1955, Serial No. 537,241

11 Claims. (Cl. 198—33)

This invention relates to method for apparatus for orienting drupaceous fruit preparatory to a cutting operation to divide the individual drupes into halves for drying.

In the fruit industry where drupaceous fruits are being handled, illustratively, for the purpose of fruit drying, it is particularly important that the individual fruits which are fed from a supply source shall be similarly oriented in position prior to halving. It is known that with few exceptions the largest diameter of a drupe is in the direction of the plane of suture. In instances where drupaceous fruits are to be halved for the purpose of drying, for instance, it is particularly important that the fruit be placed in a position such that all units may be cut or divided in uniform fashion so as to provide most readily for the removal of the pit from one half or the other. Further than this, it is important in the fruit industry that the individual pieces of fruit, when supplied along a conveyor, for instance, can be loaded upon the conveyor without regard to orientation, in order to speed the loading program, and later as the conveyor mechanism causes the fruit to be moved from one to another position, to change the orientation from one to another plane as required for symmetry.

According to the present invention apparatus is provided for supplying the fruit, illustratively, to a conveyor mechanism there to be held in suitable supporting components. A metering device is arranged to feed the fruit from a supply platform so that individual pieces of fruit will rest upon a suitable fruit support carried by the conveyor and arranged to move with the conveyor to an appropirate point of utilization. As the conveyor mechanism causes the fruit to be moved along, provision is made at a selected point in its path of travel to apply from within the fruit support fluid at suitable pressure and volume to cause the fruit to raise off the support against the force of gravity and to be freely suspended in an appropriate volume of fluid ejected from the interior of the support from any appropriate source. The fluid, as it is ejected through the fruit support, has an upward force of a magnitude sufficient to overcome the weight of the drupe so that the drupe is freely suspended without regard to any rigid support either from the conveyor belt or the supporting component carried thereby.

In the case of drupaceous fruits that are, of course, of a prolate or spheroid shape it has been found that when such fruits are freely suspended above the physical support so that they are held within the ejected fluid stream against the force of gravity, there are sufficient drag forces effective on the outside of the fruit to cause the fruit to rotate or turn to a position within the ejected fluid stream such that the largest diameter of the fruit, which diameter is generally in the direction of the plane of suture, shall be transverse to the axis of the ejected fruit and generally parallel to the plane of the conveyor belt upon which the fruit was originally held. It is recognized, indeed, that for some fruits, where the fruit approaches spherical shape, the turning effect is not as pronounced as in the case where the fruit is of the shape of a spheroid or a true drupe, but with few exceptions, most drupaceous fruits can be turned readily and freely in the fluid stream to provide the desired orientation for cutting into halves.

With the application of fluid from the internal portion of the fruit support which is usually in the form of a cup, and the suspension of the fruit in the fluid stream above the cup, the conveyor mechanism, usually a belt, upon which the fruit has been originally mounted, is moved at a generally constant speed toward a point from which the fruit is discharged from the conveyor, preferably after it has been cut into two half-sections.

The invention makes provision for the reseating of the fruit upon the supporting component cup of the conveyor following its orientation under the control of the supplied fluid stream and then, with reseating, the application of fluid pressure is removed. Furthermore, according to the present invention, provision is made whereby the product of the volume and pressure of the applied fluid may be maintained at or near a maximum value for initial release of the fruit from the supporting component into the fluid stream for its orientation, and then gradually or progressively as the fruit and the conveyor move toward a final utilization point, the product of volume and pressure of the applied fluid is reduced to a minimal value at the time of fruit reseating with the fruit in its oriented position.

In addition, the invention as herein constituted, is of such nature that where fruit, for instance, is loaded from a plurality of fruit supporting components, the fruit may be subjected to the force of an appropriately directed fluid stream acting upon a multiplicity of fruit units serving to raise the drupes against the force of gravity with the fruit suspended in the fluid stream until it has been oriented so that all fruit units are arranged in substantially similar position after which the force is removed and the fruits reseated in their desired location.

With the foregoing in mind, a principal object of this invention is to provide ways and means by which drupaceous fruit can be oriented in mass or in sequence under the control of an applied fluid jet so that a multiplicity of fruit units can be oriented in sequence or collectively, and supplied to utilization points.

Other objects of the invention are those of providing simplified instrumentalities for orienting drupes to the same or similar planes, as well as to provide apparatus and a method by which control over the release and repositioning of fruit units may be established.

Still other objects and advantages of the invention will become apparent from a reading of the following description and claims in connection with the accompanying drawings wherein:

Fig. 1 is a plan view schematically representing drupaceous fruit being supplied to a conveyor mechanism;

Fig. 2 is an elevational view of the apparatus of Fig. 1, partly in section and partly taken along the line 2—2 of Fig. 1, showing particularly the shifts in the orientation of drupes in successive positions, which shifts are concomitant with movement of various units along and with the conveyor; and, Fig. 3 is a sectional view of a portion of the apparatus of Fig. 1 taken along the line 3—3 of Fig. 1 looking in the direction of the arrows.

Referring now to the drawings for a further understanding of the invention, the individual pieces of fruit 11 are fed outwardly along the guide channel 13 in the direction indicated by the arrow. The guide channel is arranged to supply the individual pieces of fruit from any appropriate supply bin or trough (not shown) and to feed the fruit pieces from the guide channel 13 in single file fashion. The guide channel 13 is preferably of elongated and trough-like formation, open at the top and of a width generally slightly in excess of the longest diameter of the pieces of fruit to be moved. The fruit, accordingly, may be rolled or otherwise moved forward along the guide channel by any appropriate method or controlled moving force finally to rest upon a fruit ejection platform 15 which is, as indicated, preferably of flattened formation having one side turned upwardly, as shown at 17.

When the fruit is caused to move along the guide channel 13 in the direction of the arrow to reach the fruit ejection platform 15, its motion along the path of the guide channel is finally arrested by its coming to rest against a disc member 19 of a metering mechanism 21. The illustrated metering mechanism provides a plurality of indexing pins 23 projecting outwardly from the periphery of a disc 19 and faced toward the fruit ejection platform 15. The pins 23 pass across the fruit ejection platform 15 slightly below the center of the supported fruit. This action dislodges the fruit from the ejection platform and moves it over to the conveyor mechanism where it comes to rest in one of the fruit supporting components shown as the cups 25 carried upon the conveyor mechanism generally indicated at 27. For this mechanism a belt is usually the most practical form of unit. Each succeeding piece of fruit 11 moves similarly on to the fruit ejection platform by the force effective on the feed or guide channel 13 so that each successive piece of fruit is removed by the next succeeding pins 23 on the disc 19 to shift the fruit to the next support cup 25 on the conveyor belt 27.

The metering mechanism 21 formed to include the disc 19 with its attached pins 23 is turned, along with a belt drive gear 29. Each of the discs 19 and the drive gear 29 is carried upon a shaft 31 held in suitable bearing members and rotated under the control of a suitable prime mover (not shown). The belt drive gear 29 has teeth 33 about its periphery. These teeth are adapted to mesh in the spaces of the links 35 of a suitable drive chain for the belt mechanism. The conveyor belt 27 carrying the fruit support cups 25, which belt is of the endless variety, loops at one end over the pair of sprockets 37 and 38, supported for rotation on the shaft 39. The support sprockets at the other end are not shown by the drawings.

The driving relationship established between the teeth 33 and the sprocket holes of the chain drive for the belt is such that, assuming 4 metering pins 23 are on the disc 19, the peripheral distance at the circumference of the gear 29 on which the teeth 33 appear, is such that 360 degrees along the gear circumference corresponds to a belt length of four distinct fruit support cups, so that the metering means may feed one piece of fruit to each support cup with rotation. The angular relationship between the pins 23 of the metering device and the fruit support cups of the belt may be established by positioning the disc 19 on the shaft 31 and then locating it to the desired fixed angular position on the drive shaft in any suitable manner, as by a set screw.

The conveyor belt 27 is formed of fabric or rubber or other suitable material, with the driving link chain 35 secured in any desired manner along its edge. The driving link chain 35 is of such character and its relationship to the metering device is such that as the metering device is rotated with the drive pinion or gear 27 driving the chain the pins 23 are centered with respect to the fruit support cups 25 of the belt and the fruit is thus discharged readily to rest on the cups. The fruit support cups 25 are positioned regularly and spaced uniformly lengthwise and upon the outer surface of the belt, and each is centered upon the belt at approximately midway between its edges. Each individual fruit support cup has an upwardly extending portion of a more or less frusto-conical form terminating in an upper support ring 41, upon which the fruit is adapted to rest. The interior of each frusto-conical fruit support cup is open with an opening 43 extending therethrough and through the surface of the belt. In the fabrication of the belt and the securement of the fruit support cups thereon, it is preferable, where the belt is of rubber or rubberized fabric, that the fruit support cups be vulcanized directly upon the belt surface.

For the purpose of spreading the belt and maintaining it in flattened position at all times there are at selected points spreader elements 47 secured between the chains or links at opposite sides. The various links of the belt may be assembled in any desired fashion to insure rigidity and positiveness of drive when driven by the drive gear 29 and the gear teeth 33.

When the fruit 11 has been removed from the fruit ejection platform 15 by the rotation of the metering pins 23 striking the individual drupes, and the drupe is caused to seat upon one of the cups of the belt, that is, the cup instantaneously directly below the drupe as it is removed from the fruit ejection platform, it will be appreciated that the orientation of the fruit is not established and cannot at such point in the operation be readily established. Thus, some drupes may be positioned, when applied to the belt and held by the support ring 41 of the fruit support cup 25, in a position such that the plane of suture or long diameter is generally along the axis of the openings 43 in the fruit support cups. Another piece of fruit may be positioned so that the long dimension is transverse to this axis, whereas still other fruits may be positioned in random fashion with respect to the two stated extreme conditions.

It is important to locate the fruit with respect to the belt and the drive in such position that if the fruit is to be accurately divided into halves, as for drying, for instance, each piece of fruit shall be similarly oriented or turned with respect to its support. To this end the belt 27 is arranged in one embodiment of the invention to pass over a support plane or platform 47 having a generally flattened surface with the spreaders 45 extending slightly beyond the edge thereof. The spreaders are caused to rest when moved within the region of the support platform 47 beneath a guide track 49, held in position by means of support pins 51 anchored in the sides 53 of a container or tank 55 extending longitudinally of the conveyor belt 27 as it is moved in the direction of the arrow. The connection established by reason of the spreader pins 45 sliding beneath the guide track 49 provides a rubbing contact and sliding fit between the lower side of the conveyor belt 27 and the support platform 47. A suitable film of grease or the like may be provided to reduce friction between these two elements or the mere presence of the ejected fluid (in case it is a liquid), is often sufficient lubrication. The fit between the components is generally reasonably fluid-tight, so that substantial fluid pressure losses from within an internal container or tank 57 will not be lost.

The support platform 47 has a slot 59 extending longitudinally thereof, as indicated by the drawings, for a distance corresponding to the spacing between two or more of the fruit support cups 25. The slot which leads into the inner tank or container 57 has its opening preferably tapered from the larger end at 61, where it is approximately that of the opening 43 through the cups, to a small width slot as shown at 63. Consequently, as the belt carrying the fruit support cups 25 moves longitudinally with respect to the support platform 47, the openings 43 through the fruit support cups 25 and the belt 27 communicate through the slot 59 with the container 57. Illustratively, when the fruit support cup first comes in contact with the slot 59 after the fruit 11 has been loaded thereupon by the action of the metering pins 23, it will be seen that the internal diameter 43 of the cups is substantially completely uncovered by the slot with the slot tapering progressively to substantially point width at its right hand end, looking at Fig. 1. Also, it will be observed from the drawings that as the fruit support cups 25 move from left to right with conveyor belt movement, less of the diameter of the opening 43 through the fruit support cup and the belt is uncovered by the slot. Then, as the belt moves beyond the boundary of the tanks 55 and 57, the orifice 43 through the cup is subjected only to atmospheric pressure, whereas within the internal tank container or reservoir 57, fluid is adapted to be supplied under pressure. This fluid, whether it be water or air, when contained within the container 57 is effective to pass through the orifice or opening 43 in the fruit support cups leading to the outer ring 41. The orifice and terminating ring acts as a nozzle, and with the fluid from the reservoir 57 passing through this nozzle at suitable pressure and volume, the velocity of the jet as it reaches the ring opening 41 forms a nozzle of suitable size and shape with respect to the cup to cause any fruit supported by the cup to be lifted away from the support ring 41 against gravitational forces to be held suspended in the fluid path. The fluid effective to pass through the cup opening 43 has an upward force or component sufficient to overcome the weight or gravitational force effective upon the fruit supported in the support rings 41. As is indicated conventionally by the curved arrows adjacent to the fruit in its diagrammed position relative to the cups, the fruit, when suspended in the ejected jet of fluid has sufficient drag force effective on its periphery to turn the fruit to a position such that its maximum diameter is in a plane essentially normal to the axial path of the fluid ejected through the nozzle 43. The forces effective on the fruit thus tend, in the case of drupes, to turn or rotate the fruit while it is suspended to the desired position of orientation, it being recognized that the effectiveness of the turning is greatest when the fruit supported in the cups is farthest from a true spherical shape.

As the belt with its fruit support cups is moved lengthwise of the slot 59 from which fluid under pressure within the reservoir or container 57 can be ejected, it is subjected to the effect of the fluid throughout the passage along the slot, but with decreases in the width of the slot with respect to the diameter of the openings 43, it will be appreciated that the product of the volume of fluid ejected through the nozzle and the pressure at which the fluid is effective at the outlet of the nozzle is gradually and progressively reduced until a time when the fruit support cup reaches a position such that a minimum amount of fluid and a reduced pressure of fluid can be realized through the nozzle. The fruit after its orientation and pressure reduction occurring coincidentally to belt travel reseats itself on the fruit support ring 41, but is oriented in a position with respect to that in which it was first placed upon the support cup, provided, of course, the initial position was other than with the major axis of the fruit spheroid generally parallel to the plane of the conveyor belt. The sequence of the orientation steps is indicated particularly in Fig. 2 by the turning indicated through an arc of approximately 90°, and in Fig. 1 the random orientation of the fruit as supplied to the fruit ejection platform has been indicated.

When the fruit, as oriented by the apparatus described, reaches a position equivalent to that shown furthest to the right of Fig. 2, it is in a location where further operations on it can be understaken, such as slicing into halves and the like.

It will be appreciated that if the fluid contained within the internal tank or reservoir 57 is water, for instance, the reseating pressure is lower at any time there is other than a substantially tight fit between the under side of the belt 27 and the guide track 47, which accounts for the above described guide track holding the belt to the support platform. In cases where the fluid supply to elevate the different pieces of fruit with respect to the fruit support cups is water, for instance, the fluid ejected from the nozzles 43 must be provided with a suitable draining tank to collect any fluid flowing beyond the confines of the belt. Drainage is provided in the disclosed apparatus by way of the conduit 65 of the outer tank 55 from which the fluid can be removed by way of the outlet pipe 67.

Fluid entering into the high pressure internal tank or reservoir 57 is supplied thereto by way of an inlet pipe 69 connecting to any desired form of reservoir. While one preferred form of applying fluid in appropriately controlled volume and pressure adequate to orient the fruit has been illustrated, there are various modifications possible fully within the spirit and scope of the invention, the essential factor being that provision is to be made for reducing the product of the pressure and volume of the fluid from approximately a maximum, as the fruit is initially lifted from the support ring 41 to a minimum product value as the fruit is returned to rest again upon the support rings of the fruit support cups with motion from one to another position. Further, it will be appreciated that while the application of fluid herein shown is in the nature of a liquid, that the effect can be realized by a gaseous fluid appropriately controlled from any desired source. Various other modifications of the invention may be made without departing from its spirit and scope as set fotrh in the claims hereinafter appended.

Having now described the invention, what is claimed is:

1. A method of orienting drupaceous fruit comprising positioning the fruit in random fashion in a selected plane, subjecting the positioned fruit to fluid released in such volume and pressure as to dislodge the fruit from its initial position and to turn it within the fluid stream to a position wherein the axis of greatest diameter is approximately transverse to the path of fluid application, and then progressively reducing the pressure and volume of fluid to re-position the fruit in the selected plane in substantially its turned position.

2. A method of orienting drupaceous fruit comprising positioning the fruit in random fashion in a selected plane, directing a fluid jet of such volume and pressure against supported fruit from beneath to dislodge the fruit from its initial position against the force of gravity to suspend the fruit in space and to permit it to turn within the fluid stream to a position such that the axis of its longest dimension is approximately transverse to the jet axis and then progressively reducing the volume and pressure of the fluid to permit the fruit to return by gravity to the plane of initial positioning while maintaining its turned position.

3. A method of orienting drupes which comprises moving the drupes in sequence and in random axial array along a selected plane, directing a fluid jet of such volume and pressure against the drupes to raise the drupes against the force of gravity to suspend each drupe in sequence in space and to permit it there to turn within the fluid stream to a position such that its major axis is approximately transverse to the jet axis, and then progressively reducing the volume and pressure of the fluid to permit the drupes in sequence to return by gravity to the plane of initial positioning while maintaining the established axial positioning.

4. A method of orienting drupes which comprises feeding a sequence of alined and spaced drupes in random axial array transversely of a selected orientation plane, directing a fluid jet of selected pressure and volume against the drupes within the confines of the orientation plane and in a direction toward the drupe opposite that of the force applied by gravity to hold the drupes in the plane, maintaining the product of pressure and volume of the fluid effective upon the drupes such that initially the drupe is lifted from the orientation plane and suspended in the fluid to turn so that its long axis is substantially normal to the jet axis and parallel to the feed path, and then progressively reducing the product of pressure and volume of the fluid to a valve such that the force of gravity acting upon the drupe is sufficient to return it against the fluid to the selected orientation plane in its turned position.

5. Apparatus for orienting drupes which comprises means to move a sequence of drupes in random axial array along a selected plane, means for directing fluid of such volume and pressure against the drupes from the plane of their movement to raise the drupes against the force of gravity in sequence and to suspend each drupe in space and to permit it there to turn within the fluid stream to a position such that its major axis is approximately transverse to the jet axis and parallel to the plane or movement, and means progressively to reduce the product of the volume and pressure of the applied fluid jet to permit the drupes in sequence to return by gravity to the plane of initial positioning in the oriented axial positioning.

6. Apparatus for orienting drupes which comprises conveyor means to feed a spaced sequence of drupes oriented in random axial array transversely of the plane of conveyor movement, fluid jet means for supplying along the plane of conveyor movement fluid directed at selected pressure and volume against the drupes within the confines of the orientation plane and in the direction toward the drupe opposite that of the force applied by gravity tending to hold the drupes in the plane of the conveyor means, means to maintain the product of pressure and volume of the fluid effective upon the drupes such that initially the drupe is lifted from the orientation plane and suspended in the fluid and turned to a position wherein its major axis is parallel to the conveyor and normal to the jet plane and means for progressively reducing the product of pressure and volume of the fluid to a value such that the force of gravity acting upon the drupe is sufficient to return it against the fluid to the conveyor plane in its turned position.

7. Apparatus for orienting drupaceous fruit comprising a support bed, a fruit carrying feed belt having a plurality of raised spaced fruit support cups held thereon to extend outwardly thereof from one side, each cup having an outer fruit support ring and a central opening extending axially of the said ring through to the opposite side of the belt, means to move the belt across the support bed, means for releasing fluid under pressure from the plane of the support bed to pass through the cup opening as each cup is moved thereacross with belt movement, and means to alter the product of the volume and pressure of released fluid directed through the cup opening during the course of movement across the support bed, the product alteration being a change from substantially a maximum at the time of initial fluid application as cup movement across the bed is initiated to a minimum at the end of the path of cup traverse across the bed so that fruit seated upon the support ring is lifted from its support with initial fluid application and oriented to a plane such that the long dimension is alined substantially parallel to the belt and bed and means effective at the termination of the pressure application to re-seat the fruit upon the support ring of the cup in the oriented position.

8. Apparatus for orienting drupaceous fruit comprising a fruit conveyor feed belt having a plurality of spaced fruit support cups held thereon to extend outwardly thereof from one side, each cup having an outer fruit support ring and an opening extending axially of the ring through to the opposite side of the belt, a support bed, means to move the belt across the support bed, metering means to supply fruit to the conveyor belt and to the support ring of each cup, means for releasing fluid under pressure from the plane of the support bed to pass through the cup opening as each cup as moved thereacross with belt movement, and means to alter the product of the volume and pressure of the released fluid directed through the cup opening during the course of movement across the support bed, the product alteration being a change from substantially a maximum at the time of initial fluid application as cup movement across the bed is commenced to a minimum at the end of the path of cup traverse of the bed so that fruit seated upon the support ring is lifted from its support with fluid applications and oriented to a plane such that the major axis is alined substantially normal to the direction of the applied fluid and parallel to the belt and bed and at the termination of the pressure application is re-seated upon the cup support ring in the oriented position.

9. Apparatus for orienting drupaceous fruit comprising a support bed, a fruit carrying feed belt having a plurality of raised uniformly spaced fruit support cups held thereon to extend outwardly thereof from one side, each cup having an outer fruit support ring and a central opening extending axially through the said ring to the opposite side of the belt, a belt drive to move the belt across the support bed at a uniform rate, means for releasing fluid under pressure from the plane of the support bed, any released fluid being adapted to pass through the cup opening as each cup is moved thereacross to form an ejection nozzle, and means to control and alter the product of the volume and pressure of released fluid directed through the nozzle provided by cup opening during the course of movement across the support bed, the alteration being a control of the range between a maximum at the time of initial fluid application as the cup starts across the bed and a minimum at the end of the path of traverse across the bed whereby fruit seated upon the support ring is lifted from its support with initial fluid flow to orient itself with its major axis alined substantially parallel to the belt and the bed and normal to the jet axis of the nozzle and with a reduction of pressure application to a minimal product value the fruit is re-seated upon the support ring in its oriented position.

10. Apparatus to orient drupaceous fruits comprising a feed belt, a plurality of spaced fruit supporting cups extending outwardly from the feed belt on one side and adapted to receive and convey fruit spheroids one per cup, each of said cups having a ring-like fruit receiving edge and each having a hollow central portion which extends through the feed belt, a bed plate, means for moving the belt transversely of the bed plate with the cups raised thereabove, said bed plate having an elongated longitudinal slotted opening extending thereacross in the direction of belt travel for a distance greater than that between any two successive cups on the feed belt, the said slotted opening being symmetrical about its longitudinal axis with the width of opening at one end communicating with an uncovering the cup opening extending through the belt from which width the slot is tapered toward its other end at which it is a minor fraction only of the said width to uncover a portion only of the belt opening, means to connect the slot area with a source of fluid under pressure so that fluid may escape through the slot and individual cup openings with the product of fluid pressure and volume ejected through the cup opening progressively diminishing as the belt moves along the slot in a direction from the large slot opening toward and beyond the small opening so that any fruit rested upon a fruit supporting cup is displaced upwardly with the release of fluid through the slot and the central cup opening as the cup opening uncovers the slot to an extent such that the product of pressure and volume is a maximum and concurrently therewith the fruit, due to its shape, is turned, while suspended by released fluid, to a position above the cup such that the maximum diameter of the fruit is substantially transverse to the axis of the cup opening and, as the belt is moved along the slot to and beyond the point of minimum slot width, the product value reduces to a minimal value and the fruit is re-seated upon the cup ring in the oriented position.

11. Apparatus to orient drupaceous fruits comprising a feed belt, a plurality of spaced fruit supporting cups carried upon and secured to the feed belt and adapted to receive and convey fruit spheroids one per cup, each of said cups having a ring-like fruit receiving edge and each having a hollow central portion, the plane portion of said feed belt having openings therethrough concentric with the hollow central portion of each of the fruit supporting cups, a planar feed belt support surface having an elongated longitudinally slotted opening which is symmetrical about its longitudinal axis, the width of the slotted opening at one end being of the order of the diameter of the cup openings from which width the slot tapers toward its other end at which it is a minor fraction only of the said diameter, means to move the feed belt and the therewith supported fruit carrying cups across the planar belt supporting surface in a path longitudinally of the slot with the centers of the cup opening alined with the longitudinal axis of the slot, connections to the slot adapted to supply thereto fluid under pressure for escape through the slot and individual cup openings in progressively diminishing quantities as the belt moves along the slot in a direction from the large opening toward and beyond the small opening so that any fruit rested upon a fruit supporting cup is pressure-displaced upwardly with the release of fluid through the slot and the nozzle formed by the central cup opening as the cup opening uncovers the slot and concurrently therewith the fruit, due to its shape, is turned, while suspended by released fluid, to a position above the cup such that the maximum diameter of the fruit is substantially transverse to the axis of the cup opening and, as the belt is moved along the slot to and beyond the point of minimum slot width, the fruit is re-seated upon the cup ring in the oriented position.

References Cited in the file of this patent

UNITED STATES PATENTS

| | | |
|---|---|---|
| 1,711,051 | Gates | Apr. 30, 1929 |
| 2,293,121 | Dudley | Aug. 18, 1942 |